United States Patent [19]

Hahn et al.

[11] Patent Number: 5,410,053
[45] Date of Patent: Apr. 25, 1995

[54] RHODAMINE DERIVATIVES

[75] Inventors: Erwin Hahn, Heidelberg; Claudia Kraeh, Ludwigshafen; Udo Mayer, Frankenthal; Bernhard Albert, Maxdorf; Walter Denzinger, Speyer, all of Germany

[73] Assignee: BASF Aktiengesellschaft, Ludwigshafen, Germany

[21] Appl. No.: 213,596

[22] Filed: Mar. 16, 1994

Related U.S. Application Data

[63] Continuation of Ser. No. 56,386, May 4, 1993, abandoned.

[30] Foreign Application Priority Data

May 11, 1992 [DE] Germany .................. 42 15 391.3
May 11, 1992 [DE] Germany .................. 42 15 394.8

[51] Int. Cl.$^6$ ............... C07D 221/18; C07D 311/88; D06P 3/52; D06P 3/70
[52] U.S. Cl. ........................... 546/48; 549/227; 8/509; 8/510; 8/511; 8/516
[58] Field of Search ........... 546/48; 549/227; 8/509, 8/510, 511, 516

[56] References Cited

U.S. PATENT DOCUMENTS

| | | |
|---|---|---|
| 1,921,857 | 8/1933 | Zschimmer et al. |
| 1,967,912 | 7/1934 | Stocks et al. |
| 2,263,385 | 11/1941 | Grimm . |
| 3,932,415 | 1/1976 | Reynolds ............ 546/43 |
| 4,005,092 | 1/1977 | Reynolds ............ 546/43 |
| 4,622,400 | 11/1986 | Hammond ............ 546/179 |

FOREIGN PATENT DOCUMENTS

| | | |
|---|---|---|
| 0130789 | 1/1985 | European Pat. Off. |
| 0209367 | 1/1987 | European Pat. Off. |
| 0285179 | 10/1988 | European Pat. Off. |
| 0327763 | 8/1989 | European Pat. Off. |
| 463260 | 10/1992 | European Pat. Off. |
| 3305011A1 | 8/1983 | Germany . |
| 748670 | 5/1956 | United Kingdom . |

OTHER PUBLICATIONS

Chemical Abstracts, vol. 73, No. 6 (1970).

Patent Abstracts of Japan, vol. 11 No. 262 (C-442) (2709), Aug. 25, 1987.
Patent Abstracts of Japan, vol. 11 No. 349 (C-456) (2796), Nov. 11, 1987.
A. Rosowsky, E. J. Modest, J. Org. Chem., 2,2,4--Trimethyl-1, 2-Dihydroquin-Olines . . . , vol. 30, pp. 1832 to 1837, (1965).
A. B. Shapiro, et al., Institute of Chemical Physics, Academy of Sciences, U.S.S.R., Hydrozyquinolines [I, $R_n=6$ or 7-HO, 6,8-(HO)2](1977).

Primary Examiner—Cecilia Tsang
Attorney, Agent, or Firm—Oblon, Spivak, McClelland, Maier & Neustadt

[57] ABSTRACT

There are described rhodamine derivatives of the formula

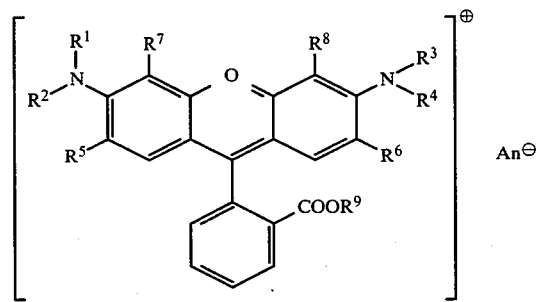

where
$R^1$, $R^2$, $R^3$ and $R^4$ are each hydrogen or substituted or unsubstituted $C_1-C_4$-alkyl, or $R^2$ is paired off with $R^5$ or $R^4$ with $R^6$ to form 1,3-propylene, which can be substituted,
$R^5$, $R^6$, $R^7$ and $R^8$ are each hydrogen or methyl,
$R^9$ is hydrogen, substituted or unsubstituted $C_1-C_4$-alkyl or a radical of the formula $(C_2H_4O-)_nH$, where n is 2 or 3, and
An$^\ominus$ is the equivalent of an anion derived from an addition or condensation polymer that contains acid groups, novel cyclic rhodamine dyes, and the use of the novel rhodamine derivatives and cyclic rhodamine dyes for dyeing polyacrylonitrile fibers, for incorporation into polymers or for preparing inks.

12 Claims, No Drawings

RHODAMINE DERIVATIVES

This application is a Continuation of application Ser. No. 08/056,386, filed on May 4, 1993, now abandoned. present invention relates to novel rhodamine derivatives of the formula I

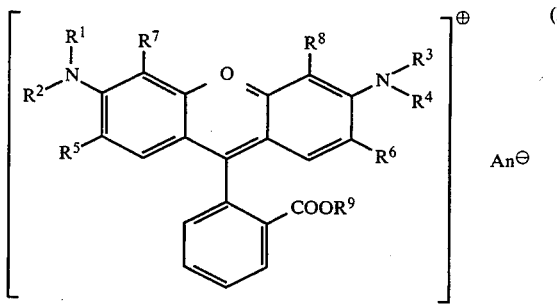

where $R^1$, $R^2$, $R^3$ and $R^4$ are identical or different and each is independently of the others hydrogen or substituted or unsubstituted $C_1$–$C_4$-alkyl, or $R^2$ may be paired off with $R^5$ or $R^4$ with $R^6$ to form 1,3-propylene, which may be monosubstituted, disubstituted or trisubstituted by $C_1$–$C_4$-alkyl, $R^5$, $R^6$, $R^7$ and $R^8$ are identical or different and each is independently of the others hydrogen or methyl, $R^9$ is hydrogen, substituted or unsubstituted $C_1$–$C_4$-alkyl or a radical of the formula $(C_2H_4O-)_nH$, where n is 2 or 3, and $An^\ominus$ is the equivalent of an anion derived from an addition or condensation polymer containing acid groups, to novel cyclic rhodamine dyes and to the use of the novel rhodamine derivatives and cyclic rhodamine dyes for dyeing polyacrylonitrile fibers, for incorporation into polymers or for preparing inks.

Rhodamine dyes are known per se and belong to the class of the xanthene dyes. Examples are C.I. Basic Red 1 (45 160), C.I. Basic Violet 10 (45 170) and C.I. Basic Violet 11 (45 175).

The known rhodamine dyes are notable for the brilliance of their colors. Prints or dyeings with these rhodamine dyes, however, generally have a very poor light fastness, and their brilliance deteriorates due to dulling or due to reduction in the fluorescence.

EP-A-463 260 describes organic pigments comprising a thermoplastic polymer matrix based on polyamide, which is virtually neutral, and a fluorescent dye, which may be a rhodamine.

It is an object of the present invention to provide novel rhodamine derivatives which are largely or completely free of the disadvantages of known rhodamine dyes.

We have found that this object is achieved by the rhodamine derivatives of the formula I mentioned at the beginning.

Any alkyl appearing in the abovementioned formula I can be straight-chain or branched.

Any substituted alkyl appearing in the abovementioned formula I may have as substituents for example hydroxyl, $C_1$–$C_4$-alkoxy, cyano or phenyl.

$R^1$, $R^2$, $R^3$, $R^4$ and $R^9$ are each for example methyl, ethyl, propyl, isopropyl, butyl, isobutyl, sec-butyl, 2-hydroxyethyl, 2- or 3-hydroxypropyl, 2- or 4-hydroxybutyl, 2-methoxyethyl, 2- or 3-methoxypropyl, 2- or 4-methoxybutyl, 2-ethoxyethyl, 2- or 3-ethoxypropyl, 2- or 4-ethoxybutyl, 2-cyanoethyl, 2- or 3-cyanopropyl, 2- or 4-cyanobutyl, benzyl or 1- or 2-phenylethyl.

$R^9$ may also be for example 5-hydroxy-3-oxapentyl or 8-hydroxy-3,6-dioxaoctyl.

$R^2$ may also be paired off with $R^5$ or $R^4$ with $R^6$ to form in each case 1,3-propylene, which may be monosubstituted, disubstituted or trisubstituted by $C_1$–$C_4$-alkyl, in particular methyl. In this case examples of possible radicals are: $-CH_2-CH_2-CH_2-$, $-CH(CH_3)-CH_2-CH_2-$, $-CH(CH_3)-CH_2-CH(CH_3)-$ or $-C(CH_3)_2-CH_2-CH(CH_3)-$, the last radical preferably being incorporated in such a way that the tertiary carbon atom is adjacent to the nitrogen atom.

$An^\ominus$ is the equivalent of an anion derived from an addition or condensation polymer containing acid groups.

Acid groups for the purposes of the present invention are in particular carboxylate and hydroxysulfonate groups.

Anionic addition polymers can be either homopolymers or copolymers.

Suitable monomers which have acid groups and on which the anionic addition polymers are based are for example acrylic acid, methacrylic acid or maleic acid, fumaric acid, the monoesters of maleic acid or fumaric acid with lower alcohols, in particular $C_1$–$C_4$-alkanols, N-(1-hydroxysulfonyl-2-methylprop-2-yl)acrylamide, N-(1-hydroxysulfonyl)-2-methylprop-2-yl)methacrylamide and 3-hydroxysulfonyl-2-methylprop-1-ene.

Suitable comonomers are for example acrylamide, methacrylamide, N-hydroxymethacrylamide, 3-hydroxypropyl acrylate, 3-hydroxypropyl methacrylate, vinyl acetate, N-vinylformamide, maleic anhydride and methyl vinyl ether.

The addition homo- or copolymers generally have an average molecular weight of from 500 to 300,000, preferably from 1000 to 100,000.

An $An^\ominus$ derived from a copolymer will in general incorporate a proportion of from 20 to 99% by weight, preferably from 50 to 95% by weight, of monomers having acid groups and a proportion of from 1 to 80% by weight, preferably from 5 to 50% by weight, of comonomers, each percentage being based on the weight of the addition polymer.

Suitable condensation polymers (polycondensates) with acid groups are for example polycondensates based on formaldehyde and naphthalenesulfonic acids, formaldehyde and naphthalene- and methylnaphthalene-sulfonic acids or formaldehyde and phenolsulfonic acids. The molar ratio of formaldehyde: aromatic is in general from 1:2 to 2:1.

The polycondensates generally have an average molecular weight of from 500 to 300,000, preferably from 800 to 70,000.

Depending on the molecular weight the polymer-based anions generally have from 10 to 2000 acid groups in the molecule. In general, the rhodamine cation is not the only counterion. On the contrary, additional counterions may be present, for example protons or sodium or potassium ions, of which protons are preferred.

In general about 0.1–80% of the acid groups in the polymer-based anion will have the rhodamine cation as counterion.

Preference is given to rhodamine derivatives of the formula I where $R^1$, $R^2$, $R^3$, $R^4$ and $R^9$ are each independently of the others hydrogen or $C_1$-$C_4$-alkyl.

Preference is further given to rhodamine derivatives of the formula Ia

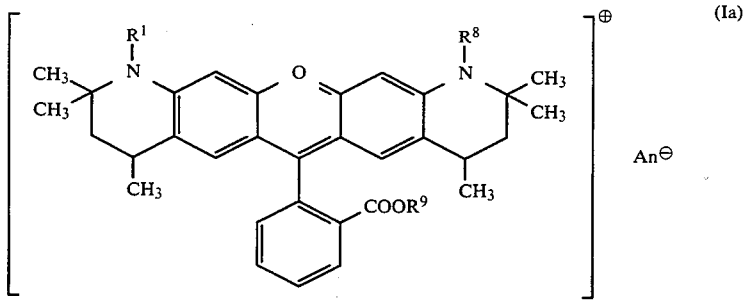

where $R^1$, $R^8$ and $R^9$ are each independently of the others hydrogen or $C_1$-$C_4$-alkyl, in particular methyl or ethyl, and $An^\ominus$ is as defined above.

The novel rhodamine derivatives of the formula I are advantageously obtained by dissolving the neutral dye-base, which can be in the lactone form or in a quinonoid form or which conforms to the formula III

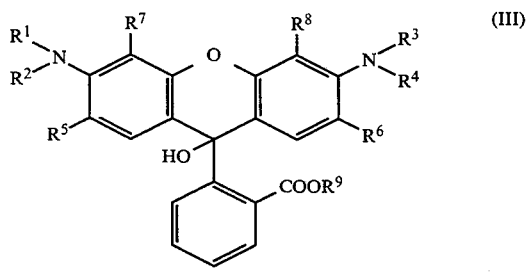

where $R^1$, $R^2$, $R^3$, $R^4$, $R^5$, $R^6$, $R^7$, $R^8$ and $R^9$ are each as defined above, in a suitable solvent, for example water, lower alcohols, such as methanol, ethanol, propanol or isopropanol, or mixtures thereof, and adding an addition or condensation polymer that contains acid groups. Here it is advantageous to use an excess of the polymer. In general, the amount used per mole of rhodamine dye will be from 1 to 500, preferably from 4 to 300, mole equivalents. Following a subsequent stirring phase at from 10° to 50° C. for from 0.25 to 24 hours the novel rhodamine derivatives of the formula I will have been formed, and they can be used in that form or, if necessary, after the solvent has been removed.

The rhodamine derivatives of the invention are advantageously suitable for dyeing polyacrylonitrile fibers, for incorporation into polymers or for preparing inks. They can also be used in the preparation of toners for electrophotography or in the preparation of fluorescent pigments.

Compared with conventional rhodamines, they have an improved light fastness.

The present invention furthermore relates to novel rhodamine dyes of the formula II

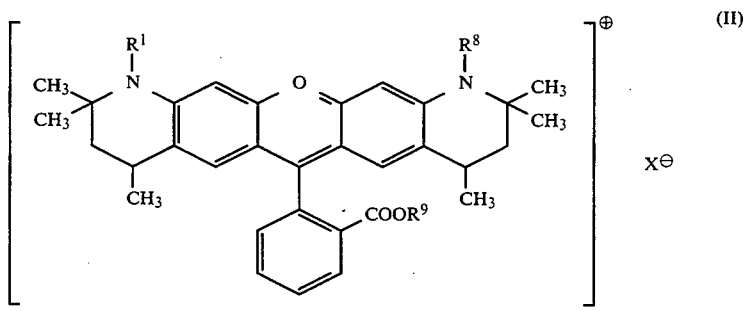

where
$R^1$, $R^8$ and $R^9$ are identical or different and each is independently of the other hydrogen or substituted or unsubstituted $C_1$-$C_4$-alkyl, and $X^\ominus$ is the equivalent of an anion, and to the use thereof for dyeing polyacrylonitrile fibers, for incorporation into polymers or for preparing inks.

U.S. patent application Ser. No. 566,924 (29 Dec. 1983) discloses dyes having a similar structure except that the carbon atoms of the two outer nitrogen-containing rings do not carry any further substituents.

It is another object of the present invention to provide novel rhodamine dyes having advantageous performance characteristics, in particular a high light fastness.

We found that this object is achieved by the rhodamine dyes of the formula II defined above. $R^1$, $R^8$ and $R^9$ were exemplified above Suitable anions from which $X^\ominus$ is derived as the equivalent of an anion are inorganic or organic anions, eg. fluoride, chloride, bromide, iodide, hydrogensulfate, sulfate, tetrafluoroborate, formate, acetate, propionate, mono-, di- or trichloroacetate, lactate, methoxyacetate, citrate, succinate, methylsulfonate, benzenesulfonate or 2- or 4-methylbenzenesulfonate.

Preference is given to rhodamine dyes of the formula II where $R^1$, $R^8$ and $R^9$ are each independently of the other hydrogen or $C_1$-$C_4$-alkyl.

Particular preference is given to rhodamine dyes of the formula I where $R^1$ and $R^8$ in each case hydrogen and $R^9$ is $C_1$-$C_4$-alkyl, in particular methyl or ethyl.

The rhodamine dyes of the formula II according to the invention can be prepared in a conventional manner, for example by reacting an aniline derivative of the formula IV

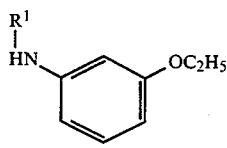 (IV)

where R¹ is as defined above, with acetone to form a dihydroquinoline of the formula V

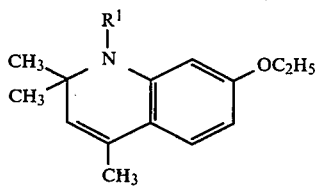 (V)

where R¹ is as defined above, hydrogenating and treating with hydrogen bromide in glacial acetic acid to form the hydroxytetrahydroquinoline of the formula VI

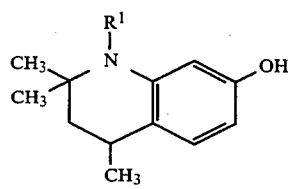 (VI)

where R¹ is as defined above. Reaction of the hydroxytetrahydroquinoline IV with, for example, phthalic anhydride then gives the rhodamine dyes of the formula II.

This method of preparation is known for example from J. Org. Chem., 30 (1965), 1832–37, SU-A-548 603 and the above-cited US patent application.

The novel rhodamine dyes of the formula II are valuable intermediates for the preparation of the rhodamine derivatives defined at the beginning. They are furthermore suitable for dyeing polyacrylonitrile fibers, for incorporation into polymers or for preparing inks. They can also be used as laser dyes or in the preparation of toners for electrophotography.

Embodiments of the invention will now be more particularly described by way of example.

A) General method of preparation and measurement 50.0 g of an anionic addition or condensation polymer are added to a solution of 1.0 g of neutral dyebase in 300 ml of water and the resulting reaction mixture is stirred at 20° C. for 12 hours.

It is applied with a wire-wound draw bar to a glass plate. Then the absorption is measured in a spectrometer, the thickness of the film being determined in such a way that a transmission of from 10 to 25% is obtained at the absorption maximum of the film.

These films are irradiated with a 1500 watt xenon lamp in a Sun-Tester from Hanau. The increase in the transmission is recorded spectrometrically at certain time intervals.

A straight line is fitted to the points and its slope is determined over a sizeable but not excessively large proportion of the increase in transmission (for example from about 15% to about 40%); the numerical value obtained is a measure of the light fastness.

The numerical value reported in Table 3 has the units of increase in transmission in percent per hour of irradiation time.

The following neutral dyebases were used:

TABLE 1

| Compound No. | |
|---|---|
| 1 | (C₂H₅)₂N—[xanthene core with O bridge]—N(C₂H₅)₂, with HO and COOCH₃ substituents on pendant phenyl |
| 2 | (C₂H₅)₂N—[xanthene core with O bridge]—N(C₂H₅)₂, with lactone (O—C=O) ring |

TABLE 1-continued

| Compound No. | Structure |
|---|---|
| 3 | Rhodamine structure with two 2,2,4-trimethyl-1,2,3,4-tetrahydroquinoline groups linked via xanthene oxygen, bearing a 2-carboxyphenyl substituent (COOH) |
| 4 | Same core as compound 3, but with COOCH₃ (methyl ester) instead of COOH |
| 5 | Rhodamine with (C₂H₅)₂N— group on one side, =NH and two CH₃ groups on the other side of the xanthene, bearing 2-carboxyphenyl (COOH) substituent |

The following addition or condensation polymers were used:

TABLE 2

| No. | Polymer | Average molecular weight |
|---|---|---|
| 1 | Naphthalenesulfonic-formaldehyde condensate | |
| 2 | Polyacrylic acid | 4,000 |
| 3 | Maleic acid/acrylic acid copolymer | 3,000 |
| 4 | Polyacrylic acid | 20,000 |
| 5 | Polyacrylic acid | 100,000 |
| 6 | Polyacrylic acid | 250,000 |
| 7 | Copolymer of maleic acid and 3-hydroxypropyl acrylate | 1,200 |
| 8 | Copolymer of acrylic acid and 3-hydroxysulfonyl-2-methylprop-1-ene | |
| 9 | Copolymer of acrylic acid and N-(1-hydroxysulfonyl-2-methylprop-2-yl) acrylamide | |
| 10 | Lightly crosslinked polyacrylic acid | |
| 11 | Copolymer of maleic acid and vinyl methyl ether | |
| 12 | Crude naphthalenesulfonic acid-formaldehyde condensate | |

The following table lists the light fastness values of the novel rhodamine derivatives measured by the abovementioned method:

TABLE 3

| Ex. No. | Parent dyebase (Tab. 1) | Polymer (Tab. 2) | Light fastness |
|---|---|---|---|
| 1 | 1 | 1 | 0.57 |
| 2 | 1 | 2 | 0.94 |
| 3 | 1 | 3 | 1.25 |
| 4 | 1 | 4 | 2.69 |
| 5 | 1 | 5 | 1.56 |
| 6 | 1 | 6 | 1.41 |
| 7 | 1 | 7 | 2.42 |
| 8 | 1 | 8 | 0.93 |
| 9 | 1 | 9 | 1.04 |
| 10 | 1 | 10 | 1.25 |
| 11 | 1 | 11 | 1.44 |
| 12 | 2 | 8 | 1.20 |
| 13 | 5 | 2 | 1.33 |
| 14 | 3 | 2 | 0.32 |
| 15 | 4 | 2 | 0.20 |

Table 4 lists for comparison the light fastness values of rhodamine dyes having customary counterions or of the corresponding neutral dyebase:

TABLE 4

| Ex. No. | Parent dyebase (Tab. 1) | Anion | Light fastness |
|---|---|---|---|
| 16 | 1 | ZnCl₃⁻ | 46.96 |
| 17 | 2 | Cl⁻ | 96.01 |
| 18 | 3 | CH₃COO⁻ | 33.82 |
| 19 | 4 | CH₃OSO₃⁻ | 12.00 |
| 20 | 5 | — | 21.80 |

B) Preparation of cyclic rhodamine dyes

EXAMPLE 21

28 g of 2,2,4-trimethyl-7-hydroxytetrahydroquinoline and 17 g of phthalic anhydride were mixed with 8.5 g of zinc chloride. The mixture was heated to 165° C. and kept at that temperature for 5 hours. The mixture was then solidified by cooling, pulverized and added to 100 ml of water. After sodium hydroxide solution had been used to set a pH of from 8 to 9, the crystalline precipitate was filtered off with suction and washed with water. To remove residual quantities of zinc, the filter residue was added to 15 ml of 25% strength by weight aqueous ammonia solution. The mixture was stirred at room temperature for 1 hour, and the crystalline product was filtered off with suction and washed with water. Drying at 60° C. left 25 g of dyebase, which were added to water and treated with acetic acid. The precipitate was then filtered off with suction and dried to leave the dye of the formula

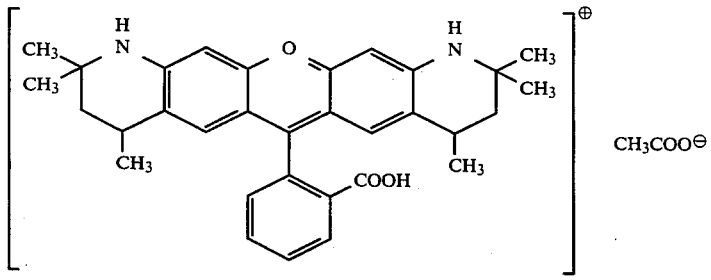

EXAMPLE 22

25 g of the dye of Example 1 were introduced into 100 ml of γ-butyrolactone together with 4 g of magnesium oxide. 13 g of dimethyl sulfate were added, and the mixture was initially heated to 100° C. After 5 hours the temperature was raised to 130° C. and held at that value for an additional 3 hours. After cooling down to room temperature the mixture was taken up in 500 ml of water. The crystalline precipitate was filtered off with suction and washed with water. Drying at 60° C. left 28 g of dye of the formula

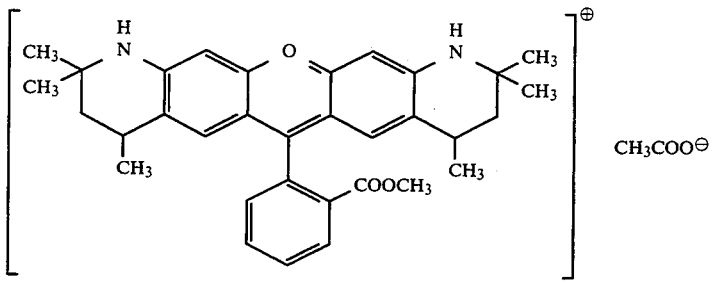

The method of Examples 21 and 22 can also be used to obtain the dyes of the formula

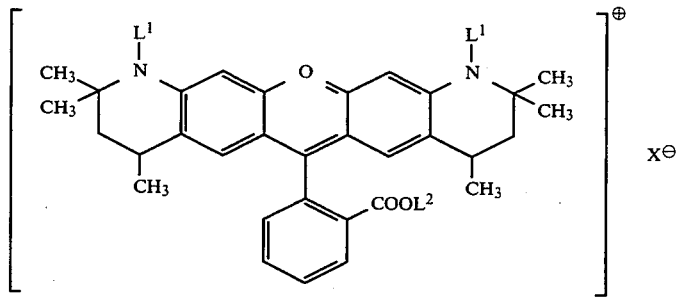

defined hereinafter. Anion exchange is possible in a conventional manner.

| Example No. | $L^1$ | $L^2$ | $X^\ominus$ |
| --- | --- | --- | --- |
| 3 | H | $CH_3$ | $Cl^\ominus$ |
| 4 | H | $CH_3$ | $BF_4^\ominus$ |
| 5 | H | $C_2H_5$ | $Cl^\ominus$ |
| 6 | $CH_3$ | H | $Cl^\ominus$ |
| 7 | $CH_3$ | $CH_3$ | $CH_3OSO_3^\ominus$ |
| 8 | $C_2H_5$ | H | $Cl^\ominus$ |
| 9 | $C_2H_5$ | $CH_3$ | $Cl^\ominus$ |

We claim:
1. A rhodamine compound of the formula (II):

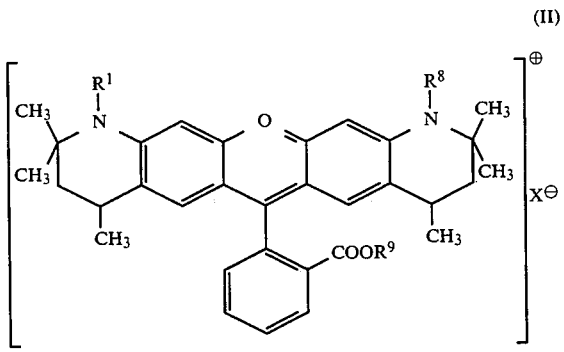

wherein $R^1$, $R^8$, and $R^9$ are identical or different and each is independently of the other hydrogen or substituted or unsubstituted $C_{1-4}$ alkyl, and $X^-$ is the equivalent of an anion derived from an addition or condensation polymer wherein said addition polymer is a homo- or copolymer containing a monomer selected from the group consisting of acrylic acid, methacrylic acid, maleic acid, fumaric acid, a monoester of maleic acid or fumaric acid with a lower alcohol selected from the group consisting of $C_1$-$C_4$-alkanols, N-(1-hydroxysulfonyl-2-methylprop-2-yl) acrylamide, N-(1-hydroxysulfonyl)-2-methylprop-2-yl) methacrylamide and 3-hydroxysulfonyl-2-methylprop-1-ene and wherein said condensation polymer is based on a polycondensate based on formaldehyde and an aromatic acid, selected from the group consisting of naphthalenesulfonic acid, naphthalene-methylnaphthalenesulfonic acid and phenolsulfonic acid; wherein a molar ratio of formaldehyde to aromatic acid is from 1:2 to 2:1.

2. A rhodamine compound according to claim 1, wherein the average molecular weight of the anion derived from an addition or condensation polymer is from 500 to 300,000.

3. A rhodamine compound according to claim 1, wherein $An^\ominus$ is the equivalent of an anion derived from an addition homo- or copolymer.

4. A rhodamine compound according to claim 1, wherein $R^1$, $R^2$, $R^3$, $R^4$ and $R^9$ are each independently of the others hydrogen or $C_1$-$C_4$-alkyl.

5. A rhodamine compound according to claim 1, conforming to the formula Ia (Ia)

where
$R^1$, $R^8$ and $R^9$ are each independently of the others hydrogen or $C_1$-$C_4$-alkyl and $An^\ominus$ is as defined in claim 1.

6. A method of using the rhodamine derivatives of claim 1 for dyeing polyacrylonitrile fibers, for incorporation into polymers or for preparing inks.

7. A rhodamine compound as claimed in claim 1, wherein said copolymer contains a comonomer selected from the group consisting of acrylamide, methacrylamide, N-hydroxymethacrylamide, 3-hydroxypropyl acrylate, 3-hydroxypropyl methacrylate, vinyl acetate, N-vinylformamide, maleic anhydride and methyl vinyl ether.

8. The rhodamine compound according to claim 1, wherein said homo- or copolymer has an average molecular weight of from 1,000 to 100,000.

9. The rhodamine compound according to claim 1 wherein $X^-$ is a condensation polymer based on a polycondensate based on formaldehyde and an aromatic acid selected from the group consisting of naphthalenesulfonic acid, naphthalene-methylnaphthalene-sulfonic acid and phenolsulfonic acid; wherein the molar ratio of formaldehyde to aromatic acid is from 1:2 to 2:1.

10. The rhodamine compound according to claim 9, wherein said condensation polymer has an average molecular weight of from 800 to 70,000.

11. The rhodamine compound according to claim 1, wherein 0.1–80% of the acid groups in said polymer or copolymer have rhodamine cation as counterion.

12. A method for dyeing polyacrylonitrile fibers comprising dyeing said fibers with a rhodamine dye of the formula II:

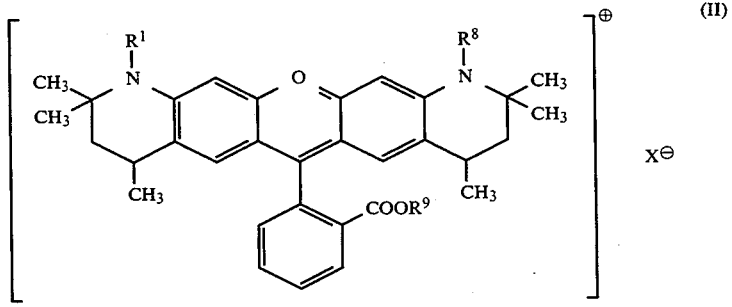

where
$R^1$, $R^8$ and $R^9$ are identical or different and each is independently of the other hydrogen or a $C_1$-$C_4$-alkyl which is unsubstituted or substituted with a hydroxyl, $C_1$-$C_4$-alkoxy, cyano or phenyl group; and
$X^\ominus$ is the equivalent of an anion.

* * * * *